United States Patent [19]
Mahrer

[11] 3,926,220
[45] Dec. 16, 1975

[54] MIXER FOR HOT AND COLD LIQUIDS
[75] Inventor: Francois-Regis Mahrer, Geneva, Switzerland
[73] Assignee: Kugler Fonderie et Robinetterie S.A., Geneva, Switzerland
[22] Filed: Dec. 9, 1974
[21] Appl. No.: 530,716

[30] Foreign Application Priority Data
Dec. 11, 1973  Switzerland.................. 17346/73
Nov. 20, 1974  Switzerland.................. 15413/74

[52] U.S. Cl............................ 137/636.1; 137/636.2
[51] Int. Cl.²..................................... F16K 19/00
[58] Field of Search........... 137/636.1, 636.2, 636.3, 137/607

[56] References Cited
UNITED STATES PATENTS
2,857,930  10/1958  Dombre................... 137/636.2 X
3,369,566  2/1968   Schmitt et al............. 137/636.1
3,812,875  5/1974   Buhler.................... 137/636.1 X Primary Examiner—Robert G. Nilson
Attorney, Agent, or Firm—Kurt Kelman

[57] ABSTRACT
A mixer for mixing hot and cold water is disclosed in which a hot water valve and a cold water valve are controlled movement of respective operating rods in directions parallel to the rotary axis of a control member. The control member has mounted therein for pivoting about an axis perpendicular to the rotary axis of the control member an actuating member which supports, in a plane fixed with respect to the actuating member, a planar cam plate rotatable in its plane with respect to the actuating member. The operating rods bear via shoes on the upper planar surface of the cam plate, in which the pivotal axis of the actuating member lies, at equal distances from the point at which the plane of the cam plate intersects the rotary axis of the control member, and a vertically adjustable abutment bears on the cam plate at a position on the bisector of the angle subtended at said point of intersection by the positions at which the operating rod shoes bear on the cam plate, so that the ratio $$\frac{R1}{R2 + R3}$$

is substantially constant over the range of possible settings of the mixer, where R1, R2 and R3 are the respective perpendicular distances to the pivotal axis of the actuating member from the positions at which the two operating rods and said abutment respectively act on the cam plate.

10 Claims, 10 Drawing Figures

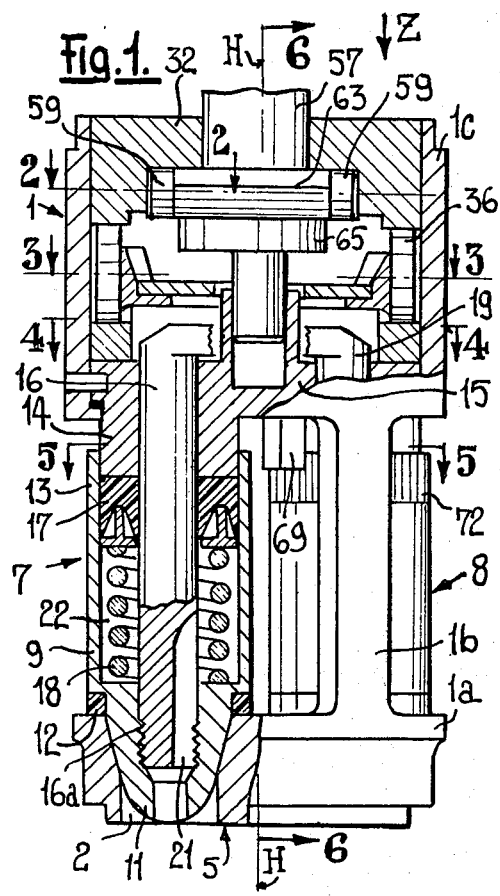
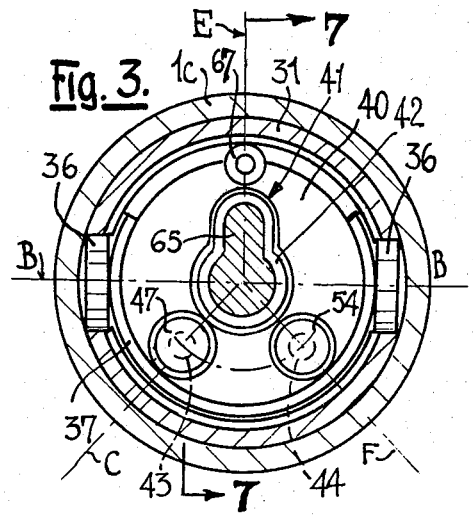
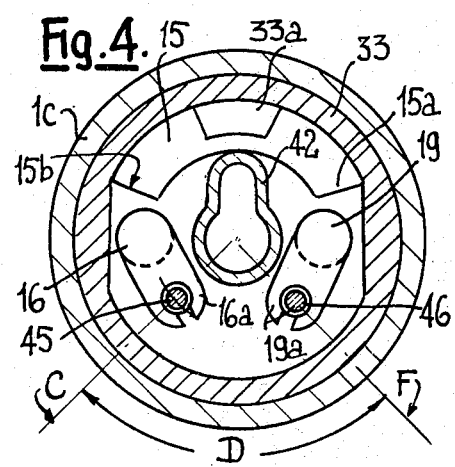
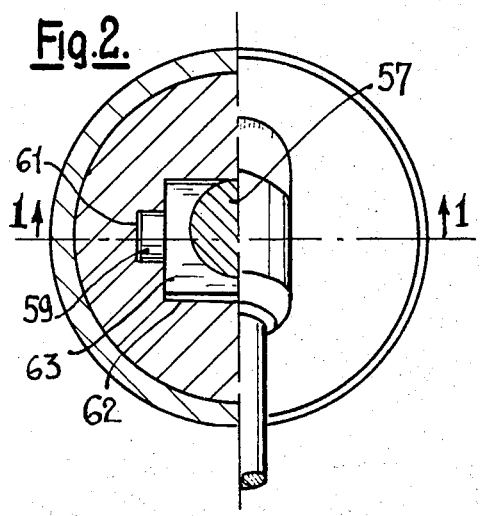
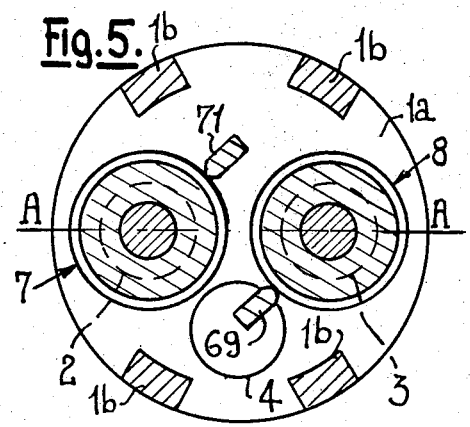

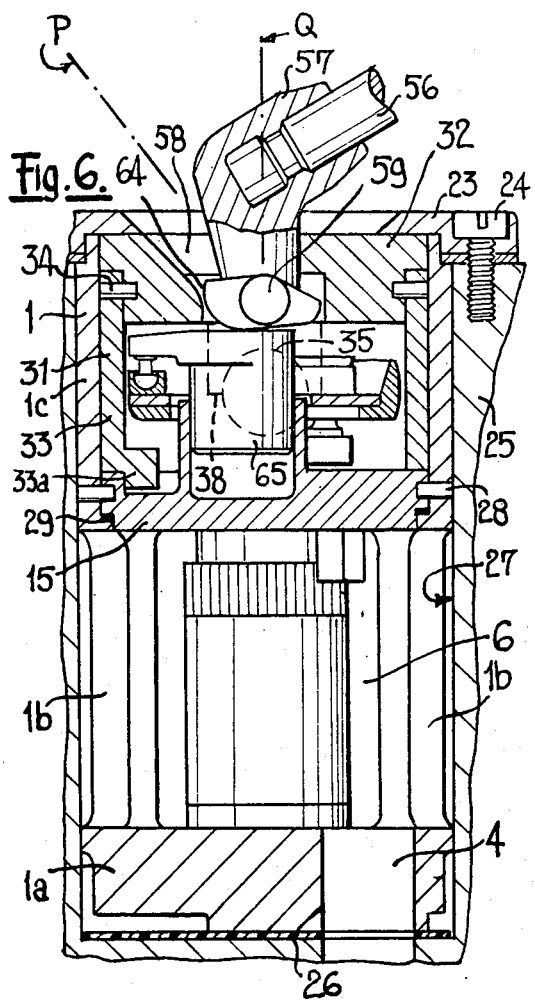
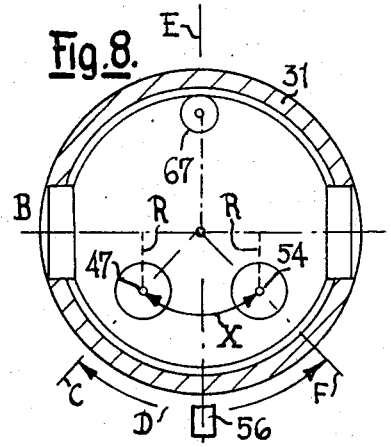
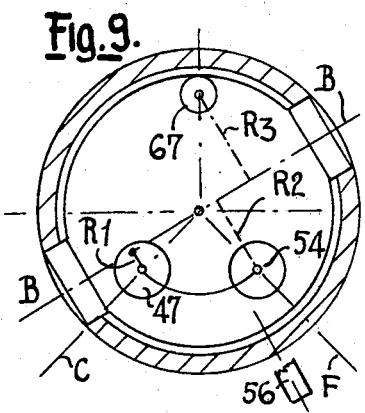
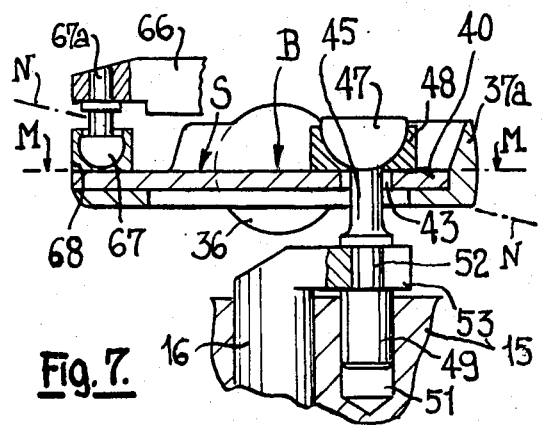
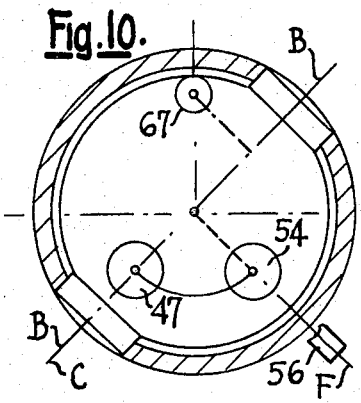

MIXER FOR HOT AND COLD LIQUIDS

BACKGROUND OF THE INVENTION

This invention relates to a mixer for mixing hot and cold liquids.

Mixers for mixing hot and cold liquids are known which comprise two liquid supply ducts, (one for the hot liquid and one for the cold), connected to a mixing chamber connected in turn to a mixture discharge duct, the flow cross-sections of the supply ducts being determined by two valve members operated by respective operating rods cooperating with a cam forming part of a rotating control element.

In known devices of this kind the cam is embodied by a variable-inclination actuating element rotatable about a first axis with the control element, the inclination of the actuating element, which is mounted for pivoting about a second axis perpendicular to the rotational axis of the control element, being controlled by a vertically adjustable abutment comprising a bearing or cam-engaging zone or position offset laterally from the first and second axes. In devices of this kind the inclination of the actuating element determines mixture delivery while the angular position of the control element determines the relationship between the deliveries from the two supply ducts and therefore the mixture temperature.

Complete independence from one another of delivery adjustment and mixture temperature adjustment cannot be achieved in the known devices for reasons mainly connected with cam shape, the geometry of the various pivoting axes and the position of the zones via which the operating rods and abutment bear on the cam. It therefore happens that altering the delivery alters temperature and vice versa, with the result of disadvantages in operation and even the risk of accidents.

SUMMARY OF THE INVENTION

It is an object of the invention to provide an improved mixer having novel features which help to ensure complete independence of delivery adjustment from temperature adjustment.

According to the invention there is provided a mixer for hot and cold liquids, comprising housing means providing a mixing chamber, first and second liquid supply ducts leading to the mixing chamber and a mixture discharge duct leading from the mixing chamber, the mixer including first and second valves in said first and second liquid supply ducts, first and second operating members for said first and second valves respectively means mounting said operating members for movement in said housing means in first direction, means coupling said valves with their respective operating members whereby the flow cross-section of the respective supply duct through the respective valve is variable by movement of the respective operating member in said first direction, a control element, and means mounting said control element for rotation with respect to said housing means about a first axis extending in said first direction, a variable-inclination actuating element, means mounting said actuating element for pivoting about a second axis perpendicular to, and intersecting, the axis of said control element and fixed with respect to said control element an adjustable abutment acting on said actuating element at a position offset from said first axis, means mounting said adjustable abutment for movement in said first direction only with respect to said casing means for varying the inclination of said actuating element about said second axis, said operating members acting on said actuating element at positions offset from each other, from said position of said adjustable abutment and from said first axis, said positions at which said operating members and said adjustable abutment act on said actuating element together defining a plane the intersection of which with said first axis is substantially equidistant from said positions at which said operating members act on said actuating element, and the position at which said adjustable abutment acts on said actuating element lying substantially on the bisector of the angle subtended at said point of intersection by the positions at which said operating members act on the actuating element, the dispositions of said positions with respect to said first axis and with respect to each other being such that over a range of possible settings of the mixer the ratio $$\frac{R3}{(R1 + R2)}$$

is substantially constant, where R1, R2 and R3 denote the perpendicular distances from said second axis to the positions at which said first operating member, said second operating member, and said adjustable abutment respectively acts on said actuating element, whereby the proportions of fluid from said first and second supply ducts in the mixture issuing from the mixture discharge duct is substantially determined by the angular position of said control element about said first axis, while the total mixture delivery is substantially determined by the position, in said first direction, of said adjustable abutment.

BRIEF DESCRIPTION OF THE DRAWINGS

In the drawings:

FIG. 1 is a view of a mixer forming one embodiment of the invention, partly in side elevation and partly in axial section on the line 1—1 of FIG. 2;

FIG. 2 is a view looking in the direction of an arrow Z in FIG. 1, partly in plan and partly in section on the line 2—2 of FIG. 1;

FIGS. 3 to 5 are views in section on the lines 3—3, 4—4 and 5—5 of FIG. 1 respectively;

FIG. 6 is an axial section on the line 6—6 of FIG. 1;

FIG. 7 is a partial view of the mixer, in section on the line 7—7 of FIG. 3 and to an enlarged scale, and FIGS. 8 to 10 are diagrammatic views of the mixer at various settings.

DESCRIPTION OF THE PREFERRED EMBODIMENT

The mixer shown in the drawings is intended to mix hot and cold water and is of use for sanitary installations, showers, wash-basins, baths and so on. It comprises a substantially cylindrical casing 1 including a circular bottom portion 1a connected by four columns or pillars 1b to a hollow top portion 1c (FIG. 1).

Part 1a is pierced with three parallel ducts 2, 3 and 4 (FIG. 5) which extend from a lower surface 5 of casing 1 into a space which is present between the member 1b and which serves as a mixing chamber 6 (FIG. 6). The ducts 2, 3 for hot and cold water supply respectively, are disposed in the same diametric plane A—A of casing 1 (FIG. 5) and have respective valves 7, 8 which control the delivery of hot and cold water to the mixing chamber 6, from which the mixture discharges through duct 4.

The two valves 7, 8 are of the same construction, and therefore only the construction of valve 7 is described in detail below. The valve 7 comprises an integral member comprising a hollow casing 9 (FIG. 1) connected at its lower end to a conical or tapering valve member 11 cooperating with a corresponding conical seat of the corresponding supply duct, total sealing tightness when the valve is in its closed position being achieved by means of a rubber gasket or seal 12. A top part 13 of casing 9 acts as a cylindrical skirt and encircles a cylindrical boss 14 extending downwardly from a fixed plate 15 received in the top part 1c of the casing (FIG. 1). A valve stem 16 screwed at zone 16a into valve casing 9 is vertically slidable in a central bore in boss 14. A lipped rubber seal 17 provides sealing tightness, on the one hand, between the protuberance 14 and the skirt 13 and, on the other hand, between the protuberance 14 and the stem 16. A compression spring 18 disposed between the valve member at the end of valve casing 9 and a bearing ring received in seal 17 biases the valve toward a closed position.

Via a rebate 21 on stem 16 a balancing or compensating chamber 22, in the form of the space within valve casing 9, is in permanent communication with the upstream part of the corresponding supply duct. The cross-sections of the supply duct and of the annular surface of protuberance 14 have the same area as one another so that the supply pressure within the respective supply duct exerts no net force tending to open or close the valve. The similarly constructed valve 8 has a valve stem 19, corresponding to stem 16 and which also extends through a respective boss in plate 15, as can be seen partially in FIGS. 1 and 4.

When closed the valves 7, 8 completely cut off the respective supply duct 2 or 3 from the mixing chamber 6. When either valve 7, 8 is open the flow through it is exactly proportional to the lift of the valve off its seat, and the lift against the bias of spring 18, is determined by a mechanism which will be described hereinafter.

Casing 1 is received in an outer casing 25; a cover plate 23 which can be seen in FIG. 6 and which bears on the top end of casing 25 and which is secured thereto by screws 24 retains casing 1 in engagement with a gasket 26 disposed between the bottom surface 5 thereof and the lower end of casing 25. Separate passages corresponding to the ducts 2, 3 and 4 of casing 1 extend to the lower end of casing 25. The cylindrical recess provided by casing 25, and in which casing 1 fits, is referenced 27 in FIG. 6. The casing 25 can take the form, for instance, of the base of a wash-basin spout whose outlet passage is in free-flowing communication with the mixture discharge duct 4.

Plate 15 is secured to casing 1 by radial pins 28, a gasket 29 being responsible for sealing tightness between these items (FIG. 6).

A control element 31 which can be seen in FIGS. 1 and 6 and which is rotatable in casing 1 is disposed in the top part thereof between plate 15 and cover plate 23. Element 31, which in general shape resembles a dome, comprises an upper end part 32 and a lower, cylindrical wall part 33 which are secured to one another by radial pins 34 visible in FIG. 6. Element 31 is formed with two diametrically opposite apertures 35 which can be seen in FIG. 6 and which serve as bearings for two cylindrical journals 36, visible in FIGS. 1 and 3, of an actuating element 37 pivotally mounted thereby in control element 31, for pivoting about a horizontal axis B—B fixed with respect to control element 31 and intersecting axis H—H. The apertures 35 exist half in part 33 and half in bottom lugs 38, visible in FIG. 6, of the part 32, the lugs being engaged in correspondingly shaped recesses in part 33. Control element 31 can rotate through an angle D = 90° in casing 1 around the vertical axis H—H thereof (FIG. 1) between two end positions indicated by radii C, F in FIG. 4. Rotation of element 31 is limited by a projection 33a of part 33, such projection abutting the ends 15a, 15 b of a rebate or recess in plate 15 (FIGS. 4 and 6). During rotation of the control element 31, the pivoting axis B—B of actuating element 37 also rotates through 90° between the two end positions corresponding to the radii C and F (FIG. 3).

Actuating element 37 has a ring 37a carrying a cam 40 acting on operating rods which will be described hereinafter and which are rigidly secured to valve rods 16, 19. Cam 40 is embodied by a strong thin planar plate received in a circular recess in ring 37a and rotatable relative to the ring 37a in the plane of the plate 40. Cam 40 is formed with a keyhole-shaped central aperture 41 through which a correspondingly shaped upwardly extending protuberance 42 of plate 15 can extend, and with two apertures 43, 44 which are visible in FIGS. 3 and 7 and through which respective operating rods 45, 46, visible in FIGS. 7 and 4, can extend.

As can be seen in FIG. 7, rod 45 has at its top end a hemispherical bearing end or head 47 received in a seat of matching shape in an element 48 slidably disposed on top surface S of cam 40. A bottom part 49 of rod 45 is slidable vertically in a blind guide bore 51 in plate 15, and a narrower central part 52 of rod 45 is engaged in a recess 53 in the end of a lateral projection 16a of valve stem 16 (FIGS. 4 and 7). As can be seen in FIG. 4, the two operating rods 45, 46, which are connected to the valve stems 16, 19 respectively, are disposed on the two radii C, F at both ends of a circle arc X of 90° opening and centred on the rotational axis H—H of control element 31 (FIG. 3). Rod 46 is devised similarly to rod 45 and has a hemispherical bearing end or head 54 which cooperates with an element, similar to element 48, slidably borne on the cam top surface S, has a bottom part similar to part 49 vertically slidable in a corresponding blind guide bore in plate 15 and has a narrower central part engaged in a recess in the end of a lateral projection 19a of valve stem 19.

An adjusting lever 56, visible in FIG. 6, has a bottom element 57, visible in FIGS. 1 and 6, which engages in an aperture 58 in end part 32 of control element 31 (FIGS. 1 and 6). Element 57 has two journals 59 which are received in hemi-cylindrical recesses 61 extending to the bottom surface of end part 32 and disposed on either side of a rectangular central portion 62 of aperture 58 (FIG. 2). Journals 59 permit angular movement of lever 56 about the axis of journals 59 relatively to end part 32 between two end positions of the element 57, such positions being indicated by radii P and Q in FIG. 6, in which positions element 57 abuts opposite edges of apertures 58.

Element 57 has a central portion 63 (FIG. 1) with a cam surface 64 (FIG. 6) cooperating with the top surface of a vertically movable central abutment 65 slidable in protuberance 42 (which is hollow) of plate 15. Because of the keyhole-shape of its portion engaged in protuberance 42 (FIG. 3), element 65 cannot rotate.

Disposed at the end of a lateral arm 66 of element 65 is a finger 67a having a hemispherical bearing head or end 67 cooperating with an element 68 borne slidably on the cam top surface S (FIG. 7). Head 67 serves as a vertically movable bearing zone for cam 40. Such zone, which is fixed angularly, is disposed on bisector E of the right-angle between the two spherical ends 47 and 54 forming the zones via which the operating rods bear on cam 40 (FIG. 3). Bisector E is also perpendicular to the diametric plane A—A in which the valves 7, 8 are disposed.

When lever 56 is in the end angular position Q visible in FIG. 6, element 65 is in a top position in which the bottom part of the spherical member 67 registers exactly with the pivoting or tilting axis B—B of actuating element 31, and so the plane surface S of cam 40 is disposed completely horizontally along the line M—M of FIG. 7. With the cam in this horizontal position, the valves 7, 8 are just closed, adjustment of their position being possible during assembly by varying the extent to which the valve members are screwed on the valve rods 16, 19 such members being retained in the position to which they are screwed by plastics fingers, 69, 71 which are rigidly secured to plate 15 FIGS. 1 and 5), engaging in grooves 72 in the valve members.

Angular movement of lever 56 towards position P (FIG. 6) makes it possible to lower head 67 to modify the tilt or inclination of cam 40 which pivots around the tilting or pivot axis B—B of actuating element 37. As cam 40 tilts, rods 45, 46 rise in proportion to their distance from the axis B—B; in their movement they move with them their valves 7, 8 against the biasing of compression spring 18. When the lever changes over to position P, the cam top surface S moves from the plane M—M to the plane N—N (FIG. 7).

The lever 56 is also a means of rotating the control element 36, and therefore the tilting or pivoting axis B—B, around the vertical axis H—H between the two end positions F and C (FIGS. 3 and 4). When lever 56 is in its central position as shown in FIG. 8, so that the axis B—B is perpendicular to the bisector E of the angle D between the bearing zones of the operating rods, the two members 47, 54 are at the same distance R from the cam pivoting axis B—B; consequently the result of angular movement of lever 56 in a vertical plane is that, due to the tilt or inclination imparted ot cam 40, the two valves 7, 8 are simultaneously opened or closed to the same extent, the mixture remaining at an average temperature independently of delivery adjustment provided that the hot liquid reaches the mixer at the same temperature.

When lever 56 is moved to position F visible in FIG. 10, head 54 of the cold-water valve 8 is disposed on a cam part which rises as lever 56 pivots, whereas head 57 of the hotwater valve 7 is disposed on a cam part coinciding with the axis B—B whose vertical position remains unchanged. With the lever 56 in the angular position F, pivoting of lever 56 between positions P and Q alters the opening of valve 8 while leaving valve 7 closed, and so only cold water flows, at a rate determined by the vertical position of lever 56. When the same is in its other end position C, the coldwater valve 8 stays closed and the pivoting of lever 56 alters the setting just of the hot-water valve 7.

When the lever 56 is in any intermediate position, such as the one shown in FIG. 9, the zones via which the members 47, 54 bear on the cam are both off the axis B—B, but at different distances R1, R2. When lever 56 pivots, the two valves 7, 8 open or close in the same ratio as the ratio of the distances R1 and R2 to one another, and so the mixture delivery varies without any change in the proportion of hot and cold water, the mixture temperature remaining constant. Consequently, the angular position of lever 56 around the axis H—H controls mixture temperature whereas the angular position of lever 56 in the vertical plane determines total delivery.

The zones via which the spherical heads 67, 47, 54 bear on the cam 40 are disposed in a plane — the plane surface S of the cam 40 — which also contains the pivoting axis B—B determined by the journals 36 (FIG. 7). Also, the zone via which the abutment 67 bears on the cam 40 remains fixed angularly and is always on the bisector E. Consequently, at any angular setting of the axis B—B the ratio of the distance R3 measured between such axis and the bearing zone 67 of the abutment 65 to the sum of the distances R1 + R2 remains absolutely constant at:

$R3 / (R1 + R2) = $ constant.

This ratio is unity in the device shown but may vary in variants.

Consequently, if the lever 56 is set at a particular vertical position and rotated to alter the mixture temperature, delivery does not vary. Similarly, if lever 56 is at a particular horizontal angular setting and its vertical position is altered to vary mixture delivery, there is no alteration of mixture temperature.

This double constancy feature — i.e., constancy of delivery when the temperature is varied, and constancy of temperature when delivery is varied — is the result of the two following constructional features in the mixer described:

a. the fact that the bearing zones 47, 54, 67 are all disposed in a single plane containing the pivoting axis B—B (FIG. 7), and
b. the fact that the bearing zones 47, 54, 67 remain in the same relative angular position when the pivoting axis B—B is rotated (FIG. 8 — 10).

The bearing zones of the heads 47, 54 always remain on the same side of the pivoting axis B—B, one of such zones possibly being disposed on such axis in a limit position (FIG. 10).

Consequently, the springs 18 which tend to bias the valves closed act via the integers 47, 54 on the cam 40 to apply thereto a movement which always tends to keep the cam 40 in bearing engagement with the integer 67. The cam 40 therefore remains perfectly stable due just to the influence of the springs 18 acting directly on the valve bodies.

Due to the parallel double guiding provided by the plate 15 in respect of the valve stems 16, 19 and the operating rods 45, 46 and to the fact that the bearing zones are embodied as spherical heads, the cam 40 can be of lightweight construction, a factor which, together with its flat shape, helps to reduce bulk and simplify manufacture.

The casing 1 which contains the whole wearing mechanism is a readily disassemblable system which can be replaced without any pipe connection problems. The mixture can, if preferred, issue from the chamber by way of a duct in the casing side wall, such duct extending into the mixing chamber 6 at any orientation.

In a veriant, the circle arc X between the bearing zone of the operating rods can have an opening angle which is other than a right angle and can even be 60°;

in this event the actuating element must be turned through 120° from the cold to the hot position.

In the foregoing description terms such as upper, lower, vertical, etc., are used for convenience only. Since the operation of the mixer does not depend upon gravity the mixer may of course be mounted in any orientation, for example, with the axis H—H horizontal or inclined with respect to the vertical.

We claim:

1. A mixer for hot and cold liquids, comprising housing means providing a mixing chamber, first and second liquid supply ducts leading to the mixing chamber and a mixture discharge duct leading from the mixing chamber, the mixer including first and second valves in said first and second liquid supply ducts, first and second operating members for said first and second valves respectively, means mounting said operating members for movement in said housing means in a first direction, means coupling said valves with their respective operating members whereby the flow cross-section of the respective supply duct through the respective valve is variable by movement of the respective operating member in said first direction, a control element, and means mounting said control element for rotation with respect to said housing means about a first axis extending in said first direction, a variable - inclination actuating element, means mounting said actuating element for pivoting about a second axis perpendicular to, and intersecting, the axis of said control element and fixed with respect to said control element, an adjustable abutment acting on said actuating element at a position offset from said first axis, means mounting said adjustable abutment for movement in said first direction only with respect to said casing means for varying the inclination of said actuating element about said second axis, said operating members acting on said actuating element at positions offset from each other, from said position of said adjustable abutment and from said first axis, said positions at which said operating members and said adjustable abutment act on said actuating element together defining a plane the intersection of which with said first axis is substantially equidistant from said positions at which said operating members act on said actuating element, and the position at which said adjustable abutments acts on said actuating element lying substantially on the bisector of the angle subtended at said point of intersection by the positions at which said operating members act on the actuating element, the dispositions of said positions with respect to said first axis and with respect to each other being such that over a range of possible settings of the mixer the ratio $$\frac{R3}{(R1 + R2)}$$

is substantially constant, where R1, R2 and R3 denote the perpendicular distance from said second axis to the positions at which said first operating member, said second operating member, and said adjustable abutment respectively act on actuating element, whereby the proportions of fluid from said first and second supply ducts in the mixture issuing from the mixture discharge duct is substantially determined by the angular position of said control element about said first axis, while the total mixture delivery is substantially determined by the position, in said first direction, of said adjustable abutment.

2. The mixer of claim 1, wherein said first and second valves include respective valve members disposed symmetrically in a diametric plane in which lies said first axis, and means mounting said valve members for movement in said first direction, said diametric plane being perpendicular to the plane in which lie both said first axis and the position at which said adjustable abutment acts on said actuating element, and wherein said angle subtended at said point of intersection by the positions at which said operating members act on the actuating element is other than 180°.

3. The mixer of claim 2, wherein said angle is 90°.

4. The mixer of claim 1, including a cam having a planar surface and supported by said actuating element with said surface in a plane which is fixed with respect to the actuating element, said second axis lying in the plane of said planar surface, and wherein said operating members and said adjustable abutment all act on the planar surface of said cam.

5. The mixer of claim 1, including means limiting rotation of said control element about said first axis to a predetermined angular range, such that the positions at which said operating members engage the actuating element are always disposed on the same side of said second axis.

6. The mixer of claim 2, wherein each said valve member has a valve stem extending in said first direction, said operating members are operating rods elongate in said first direction, and said housing means includes a fixed plate provided with bosses, said valve stems being slidably guided in respective passages through respective said bosses, for movement in said first direction, and end portions of said operating rods being slidably guided in respective passages in said fixed plate.

7. The mixer of claim 6, wherein each said valve includes a hollow casing fixed at one end to the valve member and surrounding the respective valve stem, each said casing at its other end being slidably engaged around the respective boss of said fixed plate, and passage means in each said valve member connecting the upstream part of the respective supply duct with the interior of the respective hollow casing which thereby forms a compensating or balancing chamber.

8. The mixer of claim 1, including a cam in the form of a plate, means rotatably mounting said cam in said actuating element for rotation in its own plane, with respect to the actuating element, and wherein said operating members and said adjustable abutment act on said actuating element via said cam, said operating members being operating rods which extend through apertures in said cam plate.

9. The mixer of claim 8, wherein said operating rods have hemispherical heads at their operative ends.

10. The mixer of claim 9, wherein said adjustable abutment and said operating rods both act on the same planar surface of said cam plate.

* * * * *